United States Patent [19]

Dennis

[11] 4,083,198
[45] Apr. 11, 1978

[54] AIR CONDITIONER CASE WITH CONDENSATION SHIELD

[76] Inventor: Donald I. Dennis, Rte. 4, Box 174-B, Tyler, Tex. 75701

[21] Appl. No.: 792,227

[22] Filed: Apr. 29, 1977

Related U.S. Application Data

[63] Continuation of Ser. No. 671,035, Mar. 29, 1976, abandoned.

[51] Int. Cl.² .......................... F25D 21/14; B60H 3/04
[52] U.S. Cl. .......................................... 62/285; 62/244
[58] Field of Search ................... 62/91, 285, 241, 244, 62/286, 290, 291; 312/229, 236

[56] References Cited

U.S. PATENT DOCUMENTS

| | | | |
|---|---|---|---|
| 2,099,165 | 11/1937 | Henderson | 62/290 |
| 2,696,716 | 12/1954 | Marks | 62/286 |
| 2,956,416 | 10/1960 | Taylor | 62/285 |
| 3,018,639 | 1/1962 | Bailey | 62/285 |
| 3,199,307 | 8/1965 | Willis | 62/285 |
| 3,303,666 | 2/1967 | Toper | 62/291 |
| 3,355,908 | 12/1967 | Anglin | 62/244 |
| 3,596,475 | 8/1971 | Berger | 62/286 |
| 3,756,681 | 9/1973 | Croston | 312/229 |

FOREIGN PATENT DOCUMENTS 1,018,135  1/1966  United Kingdom .................. 62/291

Primary Examiner—Lloyd L. King

[57] ABSTRACT

Disclosed is a housing for enclosing the expansion coil assembly and blower fans for an air conditioning system. The housing employs a shield or false floor which defines a cavity below the coil assembly to permit condensed moisture to collect and drain from the housing without becoming entrained in the flow of air through the coil assembly. The shield also includes adjustable tabs for positioning various sizes of coil assemblies on the top surface of the shield.

13 Claims, 5 Drawing Figures

AIR CONDITIONER CASE WITH CONDENSATION SHIELD

This is a continuation of application Ser. No. 671,035, filed Mar. 29, 1976 now abandoned.

This invention relates to air conditioning systems. More particularly, it relates to air conditioner cases, housings and the like for enclosing the expansion coil assembly of an air conditioner including a shield or false floor for aiding in the removal of condensation from the cooling coil housing.

Although compact air conditioning equipment for vehicles such as trucks, automobiles and the like has been widely used and accepted for many years, many passenger vehicles are manufactured without air conditioning equipment. Various reasons exist for failing to include air conditioning equipment in modern vehicles. For example, it is an unnecessary expense to include such equipment in vehicles used in climates where air conditioning is not required. Furthermore, many users prefer to purchase vehicles without air conditioning equipment and later install the equipment, thereby lowering the initial investment in the vehicle. For these and various other reasons a substantial market exists for "add on" or "after market" air conditioning equipment which may be installed after delivery of the vehicle to the purchaser.

In the interest of conserving space, expense and asthetic appearance, as well as for functional reasons, the air conditioner expansion or cooling coil is ordinarily encased in a molded plastic housing which supports blower fans directly behind the expansion coil to direct air through the coil and into the interior of the passenger vehicle. Such molded plastic cases or housings have become well known in the art and are conventionally referred to as molded cases.

The expansion coil assembly, fans, etc., are usually mounted in a molded case which consists essentially of two mating molded pieces joined together to enclose the coil and fan and form a front opening through which the cooled air is exhausted into the passenger compartment either by means of ducts, bezels or the like. Moisture contained in the air forced over the cooling coil is often condensed on the expansion coil. This condensate then drips from the coils and collects on the floor of the case. A drain hole is provided at the lowest point on the case to allow the condensate to drain from the case. Since the front of the case projects into the passenger compartment and is usually visible, the drain is usually positioned near the rear of the case so that the drain will be hidden from view. Furthermore, it is more convenient to connect a drain hose to the drain hole if the drain is positioned toward the rear of the case. Therefore, while the air is forced through the coils from back to front, the flow of condensate is generally in the opposite direction, i.e., front to back or at least laterally when the drain is on the side. In many cases, however, the air flowing through the case is forced between the expansion coil assembly and the floor of the case and tends to move the water collected on the floor of the case along with the air. Water thus becomes entrained in the air moving through the case and is sprayed into the passenger compartment along with the cooled air.

In accordance with the present invention the air conditioner case or housing includes a shield or false floor between the floor of the case and the expansion coil assembly. The shield thus provides a divider between the air flowing from back to front and the water flowing generally from front to back. The water draining from the coils may drain over the edge of the shield or through holes in the shield and collect on the bottom of the case. Air flowing on the top of the shield forces water collected thereon to the edge of the shield where it may then drain under the shield without being forced out of the case along with the cooled air. Furthermore, air may also be forced under the front of the shield and aid in forcing the water to travel from front to back toward the drain. In this manner the shield effectively divides the case in two compartments and permits the condensed water to flow from front to rear without being adversely affected by the flow of air.

The shield may also be provided with removable retainers which are positioned on the top of the shield to position the coil within the case. The adjustable tabs thus aid in adapting the molded case for use with various sizes of coil assemblies. Other features and advantages of the invention will become more readily understood from the following detailed description taken in connection with the appended claims and attached drawings in which:

For convenience the invention will be described herein with specific reference to molded plastic cases for add on or after market air conditioners. It will be readily understood and appreciated by those skilled in the art that the invention is not so limited. Similar shields may be used in connection with other housings for air conditioner cooling coils, whether molded plastic or not. It may likewise be used in connection with larger stationary units and the like.

Figure 1:
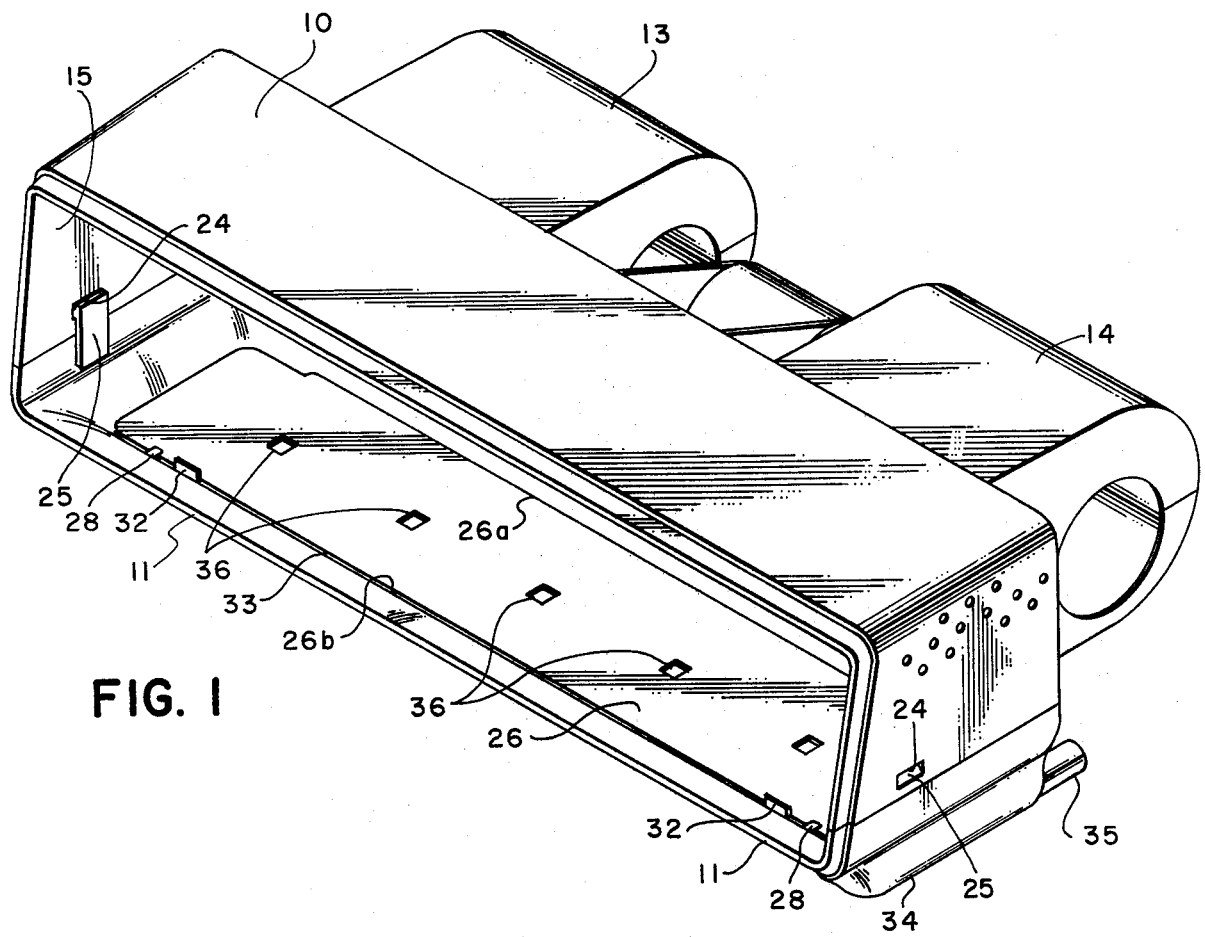
FIG. 1 is a perspective view of a molded plastic air conditioner case employing the shield of the invention.

A molded plastic case employing the preferred embodiment of the invention is illustrated in FIG. 1. The molded case comprises an upper half 10 and a lower half 11 which mate to form a unitary enclosure having a top wall, a bottom wall and side walls. The mating halves are held together by conventional means such as hooks 25 extending from the lower half 11 to mate with notches 24 in the upper half 10. Other conventional means such as bolts and the like (not shown) may also be used to retain the halves in the desired relationship with each other. The enclosure formed not only defines space for enclosing the expansion coil assembly but also includes housings 13 and 14 for enclosing blower fans which direct air through the expansion coil. The case also defines a front opening 15 through which the cooled air exits. In normal use a bezel will be attached to the front opening 15 to direct air as desired. Alternatively, the front opening 15 may be connected with an air distribution system incorporated within the dashboard, instrument panel or other portion of the vehicle.

Figure 3:
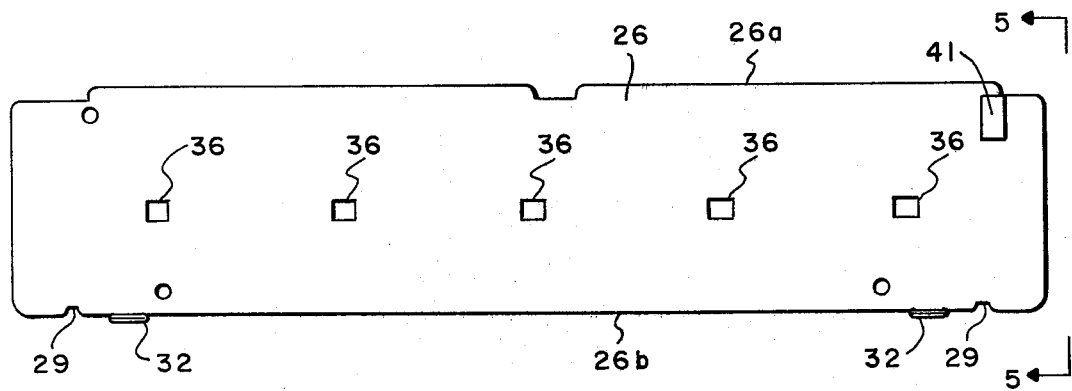
FIG. 3 is a top plan view of the shield of FIG. 1.

As viewed in FIG. 3 it will be observed that although the front and back of the case are essentially open to allow air to be directed through the coils, the lower portion of the enclosure has substantially vertically extending front and rear walls. The air conditioner cooling coil assembly is generally comprised of a convoluted conduit surrounded by parallel fins of rectangular dimensions (not shown) which fit within the cavity of the case. The cooling coil assembly ordinarily rests on the floor of the lower half 11 of the case or on shoulders or stand-offs incorporated in the case body. Thus air forced through the coils by the blower fans may travel from back to front through the entire case and carry water condensate which collects on the floor of the case toward the front of the case. Frequently, such water collects in sufficient volumes to permit the water to become entrained in the flow of air and sprayed through the opening 15 into the passenger compartment.

In accordance with the present invention a shield 26 or false flooring is provided. The top plan dimensions of the shield 26 are essentially the same as the top plan dimensions of floor 27 of the case. It is desirable that the rear edge 26a of shield 26 fit as closely as possible against the rear wall of the case so that air may not be forced between the shield 26 and the rear wall of the case. Conversely, it is preferred that the front edge 26b does not mate with the front wall of the case. To aid in positioning the shield in the proper position and retain the shield in the proper position it is preferred that the lower half 11 of the case include stand-off dogs 28 integrally formed therein which mate with notches 29 in the front edge of the shield.

Figure 4:
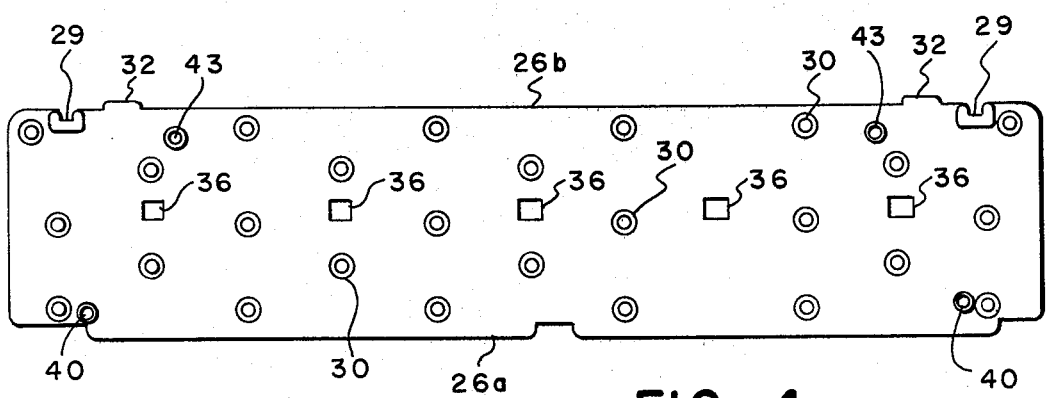
FIG. 4 is a bottom view of the shield of FIG. 3.

As illustrated in FIG. 3 the top surface of the shield 26 is essentially flat. As illustrated in FIG. 4 the bottom surface of the shield is provided with a plurality of legs or feet 30 of equal length to support the shield 26 slightly above the floor 27 of the case. In this manner a small cavity 31 is formed between the shield 26 and the floor 27 as illustrated in FIG. 2.

The shield may be provided with a plurality of holes 36 to permit condensate to drain from the expansion coil through the shield. The surface of shield 26 is preferably flat so that the expansion coil may rest directly thereon. To aid in retaining the expansion coil assembly in the proper location within the cavity of the case, the shield 26 is preferably provided with a plurality of upstanding tabs 32 along the front edge thereof. The expansion coil assembly may thus be positioned on the flat surface of the shield and pushed forward to the upstanding tabs 32 to secure the coil assembly within the cavity of the case. As illustrated in FIG. 4 the upstanding tabs 32 extend slightly forward from the front edge 26b of the shield thereby providing a space 33 or gap between the front edge 26b of the shield and the front wall of the lower half 11 of the case.

Figure 2:
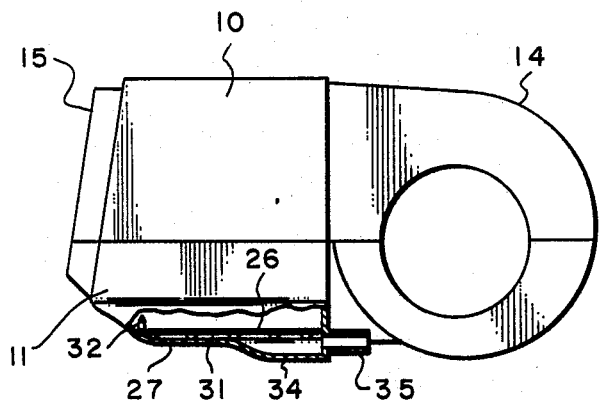
FIG. 2 is a side elevational view, partially in section, of the case in FIG. 1 illustrating the placement of the shield on the floor of the case.

As illustrated in FIGS. 1 and 2 the floor 27 of the case has a sump 34 which communicates with a drain line 35. Accordingly, water collecting on the floor 27 of the case drains into sump 34 and passes through drain line 35. A case may be provided with one or more of such sumps and drain lines. Ordinarily, one sump and drain line is formed at the rear of each side of the floor of the case.

It will be observed that when a cooling coil assembly is positioned within the case and resting on the top surface of shield 26 water which condenses on the cooling coil and fins may drain from the coil to the top of shield 26. Any water so collected may drain through the holes 36 into the cavity 31. Because of the flow of air flowing over the top of the shield 26, the water may be forced toward the front edge 26b. However, because of the space 33 between the front edge 26b of the shield and the forward wall of the case, the water forced forward by the flow of air will drain through space 33 into the cavity 31. Therefore the water does not become entrained in the flow of air but is allowed to drain from the case in the desired manner. Since the rear edge 26a of the shield rests against the rear wall of the case, air cannot enter cavity 31 from the rear. Conversely, air may enter the cavity 31 through space 33. However, if air flows in this direction the flow of air is the same as the desired direction of flow of water and the air may simply force the water toward the drain instead of out the bezel.

Various sizes and designs of case styles are presently available. Likewise, depending upon the requirements of the equipment to be installed and the design of the manufacturer, various sizes and configurations of cooling coil assemblies are also available. Cases are usually designed to accommodate a specific coil assembly. Frequently a cooling coil assembly having dimensions different from those for which the case is designed may be used. It is, of course, desirable that the cooling coil assembly be firmly positioned and held within the case.

Figure 5:
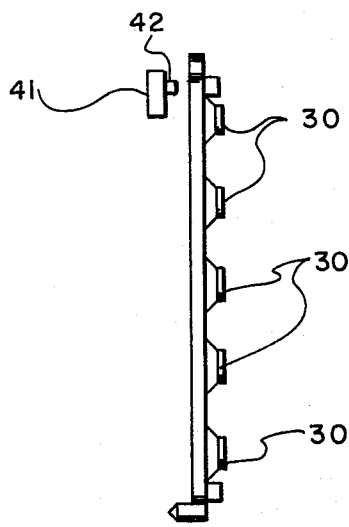
FIG. 5 is an edge view of the shield of FIG. 3.

In accordance with the present invention the shield may include adjustable tabs for mating cooling coil assemblies of various designs and sizes with a single size of housing. As pointed out above, the shield 26 preferably includes upstanding tabs 32 at the front edge 26b thereof to limit the forward position of the front edge of the cooling coil assembly. The shield 26 may also be provided with a plurality of vertical holes 40 near the rear edge 26a. The holes 40 are adapted to mate with and retain tabs 41 as shown in FIGS. 3 and 5. Tabs 41 preferably comprise a rectangular body having opposed major faces and a post extending from one major face of the body in a direction normal to the plane of the major face. The post 42 mates with the hole 40. The tab 41 is preferably rectangular in top plan dimension as shown in FIG. 3 and the post 42 preferably extends from the bottom side thereof near one end of the tab. Accordingly, the tab may be used in either of three positions. In the first position the long side of the tab 41 is parallel with the rear edge 26a of the shield and thus defines a first rear limit for the cooling coil assembly. Alternatively, the tabs may be rotated 90° so that the short side of the tab nearest the post 42 is parallel with the rear edge 26a of the shield. The opposite end of the tab thereby provides a second rear limit for the cooling coil assembly. Alternatively, the tabs may be rotated 180° so that the end of the tab opposite the post is parallel with the rear edge 26a. In this position the end nearest the post defines a third rear limit for the coil assembly. Accordingly, the tabs may be inserted as desired to aid in adapting the shield to retain various widths of cooling coil assemblies within the housing.

Similar holes 43 may be aligned near the front edge 26b. Tabs 41 may be positioned in holes 43 in either of the three positions as hereinabove described to provide alternate front limits for the edge of the cooling coil assembly as desired. Accordingly, through the use of upstanding tabs 32 and adjustable tabs 41, the front and rear limits for the cooling coil assembly may be adjusted as desired to adapt various widths of cooling coil assemblies to the cavity of the case. The tabs are preferably molded plastic parts which mate with the holes 40 and 43. No special tools are required to adjust the retaining tabs to fit any desired cooling coil assembly.

From the foregoing it will be observed that by means of the shield or false flooring of the invention an air conditioner housing or case may be divided into two compartments so that water may drain from the expansion coil assembly into a lower compartment which is not affected by air flowing through the case. Accordingly, the condensate may effectively drain from the coils into the lower cavity and be drained from the case. Air flowing through the case may force water on the floor of the shield toward the front edge but the water is allowed to drain from the front of the shield to the lower cavity without being forced out of the case along with the cooled air. Furthermore, the shield of the invention provides adjustable means for retaining the cooling coil within the case in the desired position to aid in stabilizing the cooling coil assembly and adapting various sizes of cooling coil assemblies to the size of the housing.

While the invention has been described with particular reference to molded plastic cases, it will be readily understood by those skilled in the art that the principles thereof apply equally to housings of other design, shape and materials. Furthermore, the invention is not limited to mobile or vehicular air conditioner equipment but may be used in connection with other types of air conditioning equipment wherein the air conditioner expansion coil is enclosed within a case through which air is directed. It will therefore be understood that although the invention has been described with particular reference to a specific embodiment thereof, the form of the invention as shown and described in detail is to be taken as the preferred embodiment of same, and that various changes and modifications may be resorted to without departing from the spirit and scope of the invention as defined by the appended claims.

What is claimed:

1. An air conditioner case comprising:
   (a) a housing having a top wall, a bottom wall and side walls defining an enclosure with a rear wall having an opening through which air enters the enclosure and a front wall having an opening through which air exits the enclosure,
   (b) an expansion coil support assembly shield adapted to support an expansion coil assembly between said shield and said top wall, said shield having substantially the same dimensions as said bottom wall positioned within said housing substantially parallel with and spaced from said bottom wall defining a cavity between said shield and said bottom wall, the rear edge of said shield adjoining the rear wall of said housing,
   (c) means for providing fluid communication between said cavity and said enclosure, and
   (d) a drain opening providing fluid communication between said cavity and the exterior of said enclosure.

2. An air conditioner case as defined in claim 1 wherein said shield includes a plurality of feet on the lower surface thereof to space said shield from said bottom wall.

3. An air conditioner case as defined in claim 1 wherein the front edge of said shield is spaced from the front wall of said housing.

4. An air conditioner case as defined in claim 1 including a plurality of holes in said shield.

5. An air conditioner case as defined in claim 1 including a plurality of tabs extending from the front edge of said shield in a direction normal to the top surface of said shield to provide a forward limit for an expansion coil assembly placed thereon.

6. An air conditioner case as defined in claim 1 including adjustable means for retaining an expansion coil assembly on the top surface of said shield.

7. An air conditioner case as defined in claim 6 wherein said adjustable means comprises a plurality of tabs adapted to mate with a plurality of holes in said shield.

8. An air conditioner case comprising
   (a) a housing having a top wall, bottom wall and side walls defining an enclosure with openings in the front and rear walls,
   (b) a drain opening,
   (c) a shield positioned within said housing substantially parallel with and spaced from said bottom wall defining a cavity between said shield and said bottom wall, the rear edge of said shield being positioned adjacent the rear wall of said housing, and
   (d) adjustable means for retaining an expansion coil assembly on the top surface of said shield, said adjustable means comprising a plurality of tabs adapted to mate with a plurality of holes in said shield.

9. An air conditioner case as defined in claim 8 wherein each of said tabs comprises a rectangular body with opposed major faces and a post extending from one major face in a direction normal to said major face.

10. An air conditioner case as defined in claim 9 wherein said post extends from said one major face near one end of said body.

11. An air conditioner case comprising
    (a) a housing having a top wall, a bottom wall and side walls defining an enclosure with openings in the front and rear walls,
    (b) a shield positioned within said housing substantially parallel with and spaced from said bottom wall defining a cavity between said shield and said bottom wall, the rear edge of said shield adjoining the rear wall of said housing,
    (c) means for providing fluid communication between said cavity and said enclosure,
    (d) a drain opening providing fluid communication between said cavity and the exterior of said enclosure, and
    (e) a plurality of tabs extending from the front edge of said shield in a direction normal to the top surface of said shield to provide a forward limit for an expansion coil assembly placed thereon.

12. An air conditioner case comprising
    (a) a housing having a top wall, a bottom wall and side walls defining an enclosure with openings in the front and rear walls,
    (b) a shield positioned within said housing substantially parallel with and spaced from said bottom wall defining a cavity between said shield and said bottom wall, the rear edge of said shield adjoining the rear wall of said housing,
    (c) means for providing fluid communication between said cavity and said enclosure,
    (d) a drain opening providing fluid communication between said cavity and the exterior of said enclosure, and
    (e) adjustable means for retaining an expansion coil assembly on the top surface of said shield.

13. An air conditioner case as defined in claim 12 wherein said adjustable means comprises a plurality of tabs adapted to mate with a plurality of holes in said shield.

* * * * *